Figure 1:
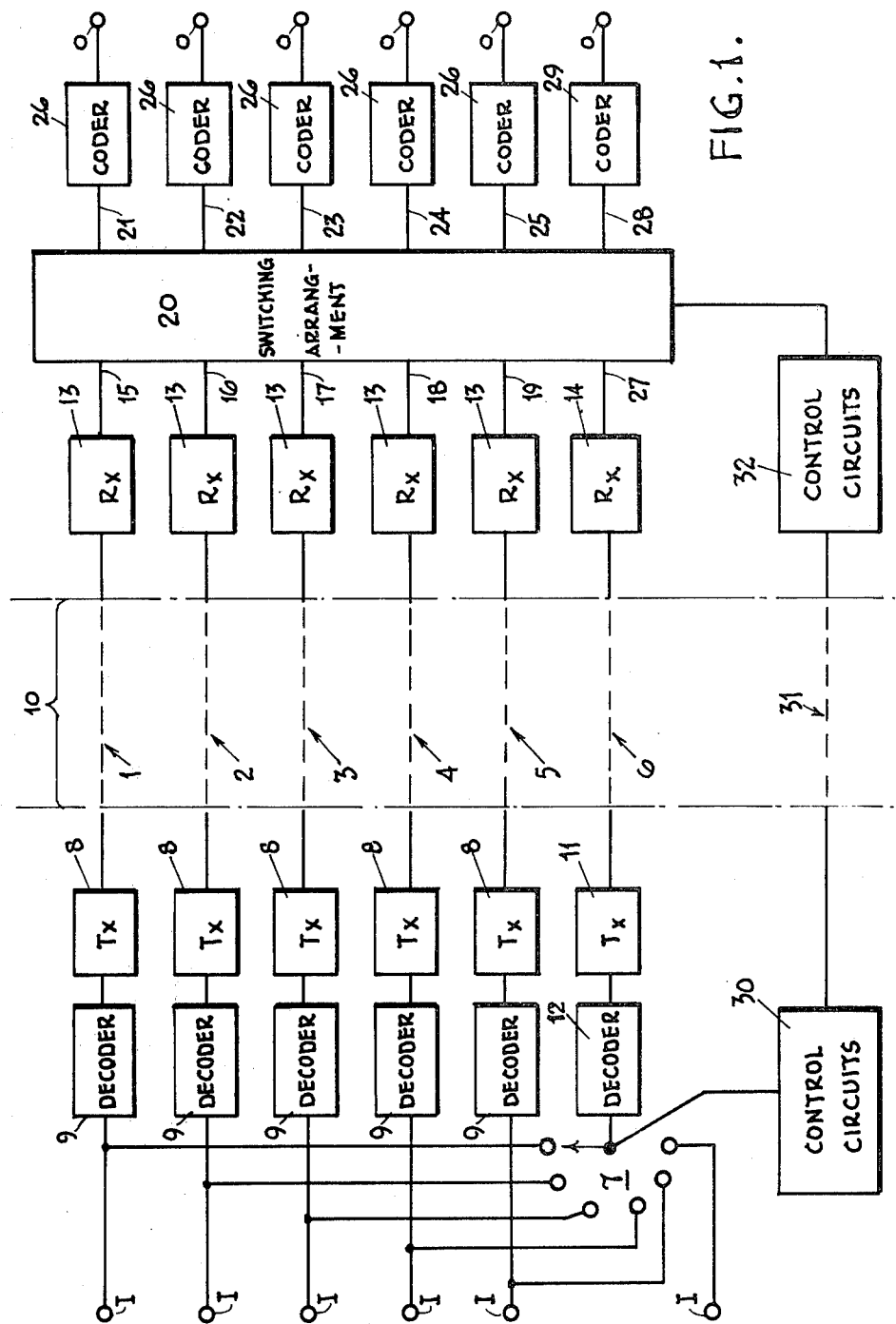

United States Patent [19]
Adderley et al.

[11] 4,234,956
[45] Nov. 18, 1980

[54] DIGITAL RELAY SYSTEMS

[75] Inventors: John A. Adderley, Holm Rook; Dennis R. Bester, Coventry, both of England

[73] Assignee: The General Electric Company Limited, London, England

[21] Appl. No.: 950,514

[22] Filed: Oct. 11, 1978

[51] Int. Cl.³ .............................................. H04K 1/00
[52] U.S. Cl. ........................................ 375/38; 455/8; 340/147 SC; 371/8
[58] Field of Search ................. 325/2, 3.56, 304, 305; 340/146.1 BE, 147 SC

[56] References Cited
U.S. PATENT DOCUMENTS

| | | | |
|---|---|---|---|
| 3,072,748 | 1/1963 | Abraham | 325/2 |
| 3,681,694 | 8/1972 | Sarati | 325/3 |
| 4,052,670 | 10/1977 | Watanabe et al. | 325/56 |

Primary Examiner—Benedict V. Safourek
Attorney, Agent, or Firm—Kirschstein, Kirschstein, Ottinger & Cobrin

[57] ABSTRACT

In a digital relay system, a standby channel is arranged to replace any one of five main channels. The standby channel contains a variable delay, and the data from the main channel to be replaced is passed along the standby channel prior to the changeover and is brought into synchronism with the data in the respective main channel by automatically controlling the length of the delay introduced by the variable delay arrangement, so that there is no slip or break in the data of the switched channel.

6 Claims, 5 Drawing Figures

DIGITAL RELAY SYSTEMS

This invention relates to digital relay systems and to apparatus for such systems. Such digital relay systems may operate over radio links or over land lines.

With digital relay systems having a number of channels it is often desirable to replace one of the channels with another channel while said one channel is operating, and in such circumstances the problem arises that some of the data being transmitted may be lost, or some of the data may be transmitted twice, when the changeover to the other channel takes place.

An object of this invention is to provide a digital relay system which overcomes the above-mentioned problem.

According to the present invention a digital relay system comprises a plurality of normal channels and a standby channel along which can be passed digital data signals from a selected normal channel, control means for adjusting the phase of the data signals passing along the standby channel into synchronism with the phase of the data signals passing along the selected channel, and switching means for replacing the selected channel with the standby channel, or vice versa, when synchronism is achieved.

Preferably, a variable delay arrangement is connected in the standby channel and is arranged to adjust the phase of the data signals passing along the standby channel.

The control means may include means for comparing the phase of the data signals passing along the standby channel with the phase of the data signals passing along the selected channel and providing an error signal which is used to adjust the phase of the data signals passing along the standby channel.

The normal channel which is to be replaced by the standby channel may be selected manually or may be selected automatically.

Figure 2:
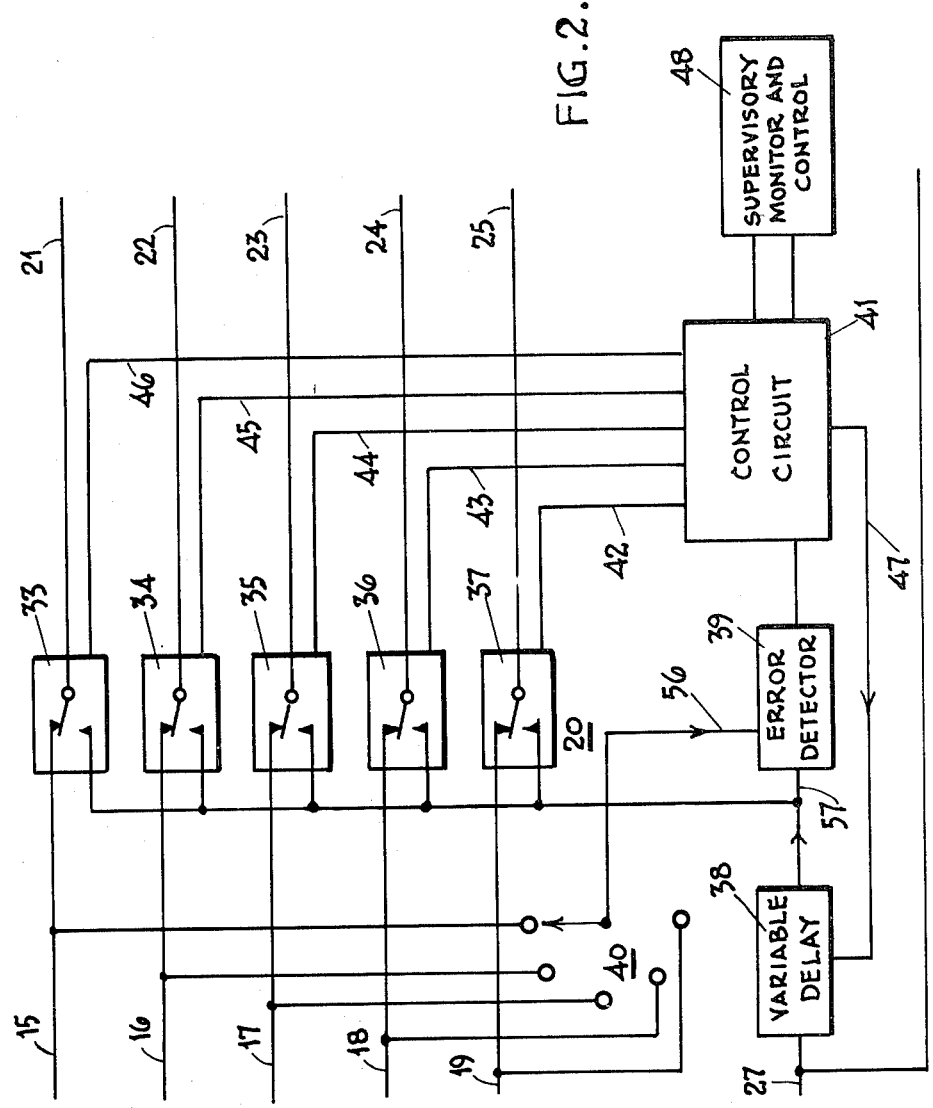
Figure 3:
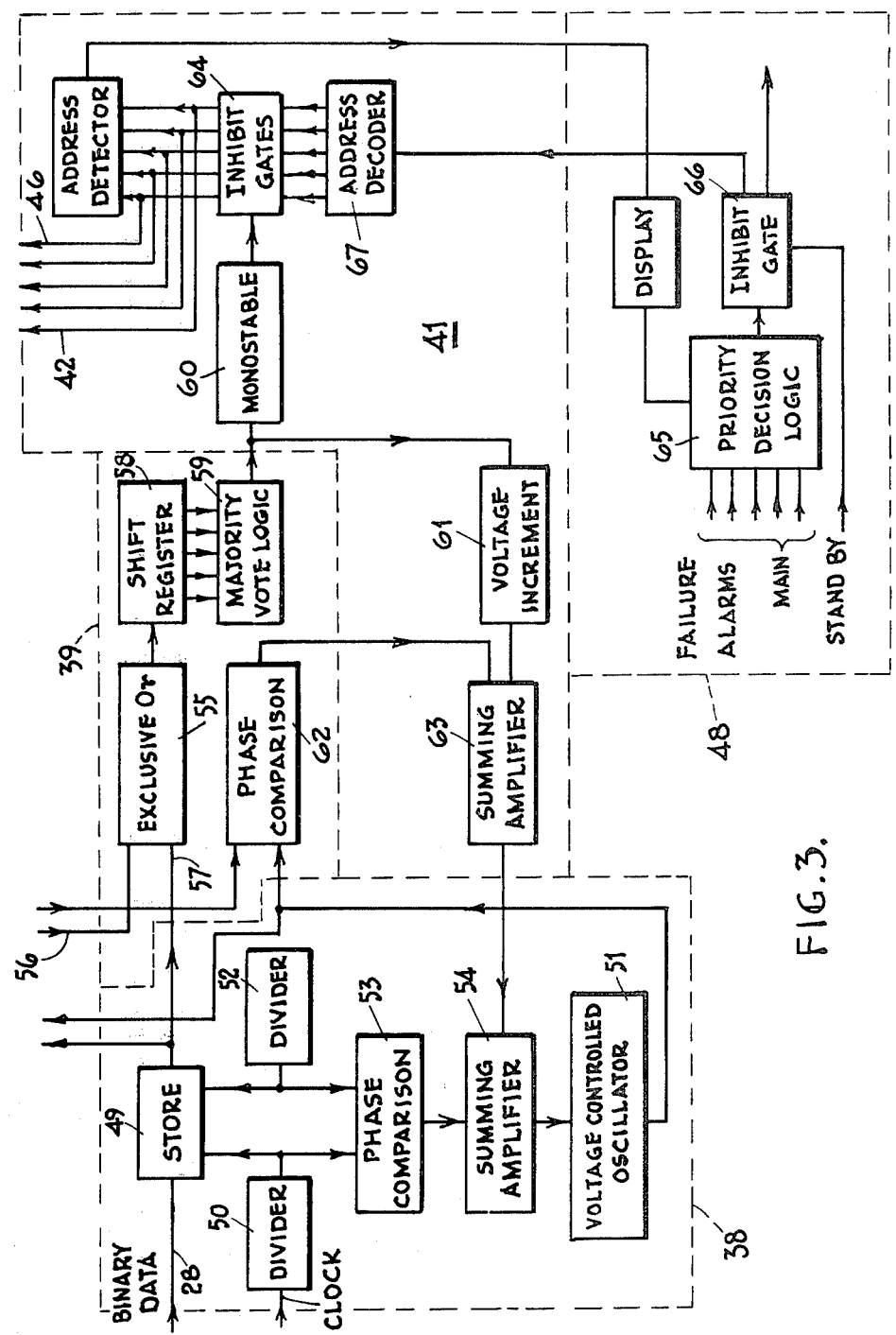
Figure 4:
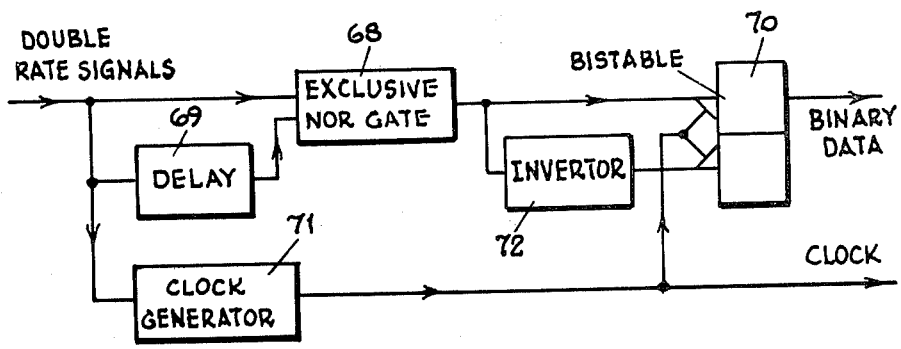
Figure 5:
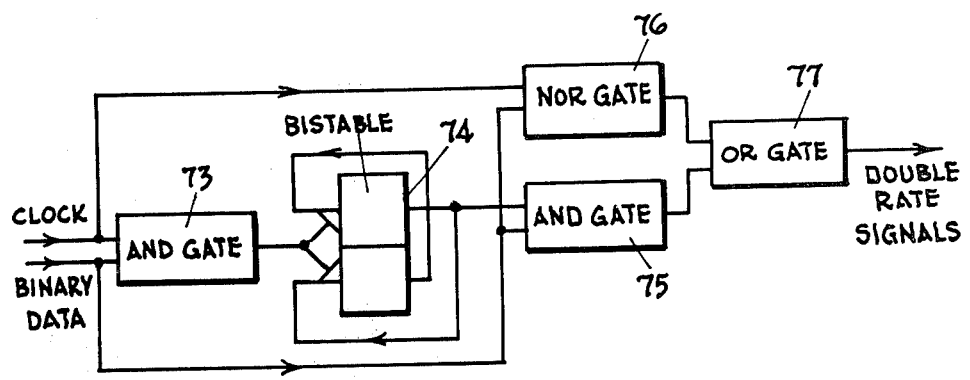

The invention will now be described, by way of example, with reference to the accompanying drawings of which:

FIG. 1 is a block schematic diagram of a digital relay system in accordance with the invention, FIG. 2 is a block schematic diagram of a switching arrangement shown in block form in FIG. 1, FIG. 3 is a block schematic diagram showing part of the arrangement of FIG. 2 in greater detail, and FIGS. 4 and 5 are block schematic diagrams respectively showing parts of the system of FIG. 1 in greater detail.

Referring first to FIG. 1, the digital relay system comprises five normal channels 1 to 5 and a standby channel 6 which extend between respective input terminals I and corresponding output terminals O and have their input terminals I connected to respective inputs of a switch 7. The input terminals I of the five normal channels 1 to 5 are arranged to have applied thereto 'double rate' binary signals of the kind described in U.S. Pat. No. 3,953,673. Such 'double rate' binary signals carry the data of a normal binary signal at twice the digit rate of the normal binary signal, each digit of the normal binary signal having one particular binary value being represented in the 'double rate' binary signal by two successive digits having the values '01' (or '10') and the digits of the normal binary signal having the other binary value being represented by successive digits having the values '00' and '11' alternately.

The input terminals I of the five normal channels 1 to 5 are connected to the respective transmitter arrangements 8 by way of respective decoders 9, each as hereinafter described with reference to FIG. 4 and each of which is arranged to derive from the 'double rate' binary signal applied to the input terminal I of the associated normal channel a normal binary signal and a clock signal comprising a train of clock pulses. The transmitters 8 may be arranged to transmit the data and clock information as phase shift modulation of one or more radio frequency carrier signals over a radio link indicated by the reference 10. The output of the switch 7 is connected to the input of a standby transmitter 11 by way of a respective decoder 12.

The radio signals on each of the channels 1 to 5 are arranged to be fed to respective receiver arrangements 13 each arranged to derive from the respective received signal a normal binary signal and a clock signal. Similarly, the signal from the standby transmitter 11 is fed to a respective receiver arrangement 14 which is arranged to derive from the received signal a normal binary signal and a clock signal. The normal binary signals from the receivers 13 are applied to respective inputs 15 to 19 of a switching arrangement 20, the corresponding output leads 21 to 25 of which are connected to respective coder arrangements 26 each as hereinafter described with reference to FIG. 5 and each of which is arranged to convert the normal binary signals to 'double rate' binary signals. The normal binary signals and the clock signals from the standby receiver 14 are also fed to an input 27 of the switching arrangement 20, a corresponding output 28 of which is connected to a standby channel coder 29 for converting the normal binary signals to 'double rate' binary signals.

The status of the switch 7, which is represented as a rotary switch, is monitored and controlled by a control circuit 30 which is connected over an auxiliary channel 31 of the radio link 10 to a further control arrangement 32 which is arranged to monitor and control the operation of the switching arrangement 20.

Referring now also to FIG. 2, the switching arrangement 20 comprises five change-over switches 33 to 37 each having a fixed contact connected to one of the inputs 15 to 19 and a movable contact connected to one of the outputs 21 to 25. The other fixed contacts of the respective change-over switches 33 to 37 are connected in common to the output of a variable delay arrangement 38 to which an input is fed from the input 27. The output of the variable delay arrangement 38 is also connected to one input of an error detector 39 which receives another input by way of a switch 40 from one of the inputs 15 to 19. The output of the error detector 39 is passed to a control logic circuit 41 having five output leads 42 to 46 each of which controls the operation of one of the change-over contacts 33 to 37. A further output lead 47 is connected to control the variable delay arrangement 38.

Referring now to FIG. 3, which shows in greater detail the control circuits 32 for the switching arrangement 20, the variable delay arrangement 38 comprises a binary shift register or store 49 into which binary data on the path 28 is entered under the control of incoming clock pulses received by way of a pulse frequency divider 50. The data is subsequently read out under the control of clockpulses generated by a voltage-controlled oscillator 51, by way of a pulse frequency divider 52, the relative phases of the two trains of clockpulses being controlled by way of a phase comparison circuit 53 and a summing amplifier 54.

The error detector 39 comprises an Exclusive Or gate 55 receiving a binary data stream from the respective main channel by way of the switch 40 and a path 56, and nominally the same data stream by way of the standby channel 6, the variable delay arrangement 38 and a path 57. The gate 55 applies ones to an eight-stage shift register 58 whenever the digit values in the two streams are dissimilar, that is whenever there is an error in transmission or the data streams are not in synchronism. A logic arrangement 59 is arranged to provide an output pulse if four or more ones enter the shift register 58, this pulse being arranged to trigger a monostable circuit 60 in the control circuit 41 and to step a "staircase" or voltage increment generator circuit 61. The increment generated is combined with the output of a clockpulse phase comparison circuit 62, by a summing amplifier 63, and the resultant voltage is applied to the summing amplifier 54 so as to offset the clockpulses generated by the oscillator 51 with respect to the received clockpulses, and thus vary the dwell of data bits in the store 49.

The arrangement described above operates in the following manner to switch data from a selected one of the normal channels 1 to 5, say for example normal channel 1, to the standby channel 6. When the normal channel 1 is to be replaced the monitor and control arrangement 48 passes a signal to the control circuit 41 and also passes a signal by way of the auxiliary channel 31 of the radio link 10 to the control arrangement 30. The arrangement 30 steps the switch 7, if necessary, so that it connects the input terminal I of normal channel 1 to the standby decoder 12, while the monitor and control arrangement 48 steps the switch 40, if necessary, so that it connects the input 15 to the input of the error detector 39 by way of the path 56. At this time the positions of all the movable contacts of the change-over switches 33 to 37 are as shown in FIG. 2.

The gate 55 in the error detector 39 therefore receives the binary data signals passing along normal channel 1 and the nominally identical data signals which are applied to the input terminal I of normal channel 1 but which pass to the standby channel 6 by way of the switch 7, and thence through the variable delay arrangement 38 and the path 57. The error detector compares the phase of the clock signals received over these two routes and also provides a voltage increment signal which is fed to the control circuit 43 by way of lead 52. As described above the increment generator 61 increases this increment signal in steps so long as four or more ones are entered in the register 58. The summing amplifier 63 thus provides an output signal which varies the offset of the oscillator 51 and thereby adjusts the delay provided by variable delay arrangement 38 until the phase of the data supplied to the error detector 39 by way of input path 57 is bit synchronous with the phase of the data supplied to the error detector 39 by way of path 56. It is found that to a reasonable degree of confidence bit synchronism can be presumed if three or less ones are present in the register 58 at any one time during a period equivalent to three thousand bit periods.

When the normal channel 1 and standby channel 6 are synchronous and the signal fed to the monostable circuit 60 has been zero for the necessary number of bit periods, a respective one of a set of inhibit gates 64 is opened and a signal is applied to the lead 46 to operate the change-over contacts 33. The signals applied to input terminal I of normal channel 1 then pass by way of the standby decoder 12 and transmitter 11, the standby radio channel 6 receiver 14 and the variable delay arrangement 38 to the switch 33, and thence to the respective coder 26 and output O. The standby channel 6 has then replaced the normal channel 1 without any significant slip or break in the data stream which is being transmitted.

Referring again to FIG. 3 the channel to be replaced by the standby channel 6 may either be selected manually, by means not shown, or may be initiated as a result of a high error rate in any one of the main channels triggering a respective failure alarm circuit (not shown). If more than one main channel fails the one with the higher priority, as ascribed by a logic circuit 65, is selected for transfer unless an inhibit gate 66 is closed by failure of the standby channel itself. The selected channel address is decoded by a logic circuit 67 to supply an operating signal for the respective one of switches 33 to 37 once the inhibit gates 64 are opened upon bit synchronism being achieved.

The arrangement may also be used to perform the reverse procedure, that is to say to restore to the channel 1 the data stream which had been transferred to channel 6. As before the error detector 39 receives signals passing along normal channel 1 by way of the switch 40 and the nominally identical signals which are applied to the input terminal I of normal channel 1 but which pass along standby channel 6 by way of the switch 7, the standby radio link 6, the receiver 14 and the variable delay arrangement 38. The error detector 39 compares the phase of the signals received over these two routes and as before adjusts the delay provided by variable delay arrangement 38 until the data supplied to the error detector 39 by way of path 57 is bit synchronous with the data supplied to the error detector 39 by way of input lead 56.

The normal channel 1 and standby channel 6 are then synchronous and the resulting opening of the inhibit gates 64 applies a restoring signal to the switch 33 to restore that switch to its original position.

Referring now to FIG. 4, the double-rate to normal binary decoders 9 each comprise an Exclusive Nor gate 68 to the two inputs of which the double rate signals are applied directly and by way of a delay circuit 69 giving a delay of one half of a normal bit period. The output of this gate 68 is applied to set and reset a bistable circuit 70, under the control of clockpulses derived from the double rate data by a clockpulse generator circuit 71, the resetting being achieved by means of an invertor 72. The decoded normal-rate binary signals are then available at the output of the bistable circuit 70.

Referring to FIG. 5 double rate signals are derived from normal rate binary signals and clock pulses by coders 26 each comprising an And gate 73, the output of which is applied to switch a cross-coupled bistable circuit 74 from one state to the other. An output from this bistable circuit is applied with the original binary data signals to an And gate 75, while the clock and binary signals are applied to a Nor gate 76. The double rate signals are then derived in an Or gate 77 from the outputs of the gates 75 and 76.

In a particular data relay system the normal binary signals are transmitted at 139.264 megabits per second and the total spread of the delay through the respective transmission channels is arranged to be not more than ±3 digits or 21 nanoseconds. In order that the variable delay required in the standby channel 6 is always positive, binary data in channels 1 to 5 may be deliberately delayed by a fixed period equivalent to 3 digit periods, or 21 nanoseconds. The delay provided by the variable delay arrangement 38 need then be no more than from 0 to 6 digit periods, or 0 to 42 nanoseconds, in order to cater for the maximum spread of delays between channels.

The radio links 10 referred to above may be replaced by land lines, which may be conventional conductors or may comprise optic fibers.

The most difficult combination of circumstances in which to test for synchronism is in a high error rate (greater than 1 to $10^4$) and quiescent data in the traffic i.e. all 1's or '0's in the traffic except for the frame alignment signal which is assumed to be of the form 1111101000000 occurring approximately every 3000 bits. In this case if the two data streams entering the error detector 40 are not properly aligned then no more than 4 errors (pulse noise) can be guaranteed in approximately 3000 digits. Thus the problem is to recognise the 1 in $10^3$ error rate due to non-alignment in the present of a noise error rate greater than 1 in $10^4$. In order to overcome this difficulty use is made of the fact that the four errors due to non-alignment of the two data streams occur within the spread of 8 digits held by the register 58 (FIG. 3).

The alignment between the two data streams entering the error detector 39 is thus determined as follows:
1. If 4 in any of the 8 digits are in error, i.e. not equivalent, the two data streams are deemed to be not aligned or not the same data.
2. If less than 4 in any 8 digits are in error for a period greater than the time between two frame alignment signals, then the two data streams are regarded as being identical and in alignment.

The monostable circuit 60 is arranged to stay set for a suitable period, that is, for at least the period between two frame alignment signals.

On the above basis, if the two data streams are not aligned and the traffic approximates to random data, then over a sample of 12 digits non-alignment will be detected to a probability of approximately 99%.

If the two data streams are correctly aligned but noise is producing a Poisson error rate of 1 in $10^2$ the probability of more than 3 errors occurring in a sample of 8 is approximately 1 in $10^6$. Thus over the time between the frame alignment signals the probability of a spurious detection of non-alignment is of the order of 1 in $10^3$.

If the two data streams are not aligned and all traffic is quiescent, except the frame alignment signals, the probability of the frame alignment signal being masked in a line error rate of 1 in $10^2$ is approximately 1 in 25.

Thus in a noise error rate of 1 in $10^2$ non-alignment can be detected in about 12 data bits or approximately 100 nanoseconds. If the band width of the control loop of the variable delay 38, comprising the phase comparison circuit 53, the summing amplifier 54 and the voltage controlled oscillator 51, is about 500 KHz the time to change the delay by 1 bit is approximately 2 microseconds. Thus all 6 delay positions can be sampled in about 10 microseconds. If data is all 'zeros' or 'ones' except for frame alignment signals the time increases to about 100 microseconds with a failure rate (depending on the 1 in $10^2$ line error rate) of 1 in 25. In lower noise conditions (1 in $10^4$ or better) the failure rate of correct alignment falls to lower than 1 in $10^3$ or better.

We claim:
1. A digital signal transmission system comprising:
   (a) transmitting apparatus at a first station and
   (b) receiving apparatus at a second station
   (c) for providing a plurality of normal transmission channels and a standby channel between said first and second stations,
   (d) means for applying digital information signals to the transmitting apparatus for transmission over the normal channels,
   (e) switching means for selecting digital information signals in respect of any one of the normal channels for transmission over said standby channel,
   (f) means providing a predetermined delay in each normal transmission channel,
   (g) means providing a variable delay in said standby channel,
   (h) comparator means
      (i) for comparing digital information signals received over said standby channel and said selected normal channel and
      (ii) for adjusting said variable delay means until said received signals are substantially in synchronism, and
   (i) switching means responsive to an output signal from the comparator indicating that said received signals are in synchronism to effect the replacement of the selected normal transmission channel by the standby channel.
2. A digital signal transmission system in accordance with claim 1 wherein the comparator means comprises an Exclusive Or gating arrangement to which said digital information signals are applied, and means responsive to an output signal from said gating arrangement over a succession of digit periods of said digital information signals to detect when said information signals are substantially in synchronism.
3. A digital relay system as claimed in claim 1, wherein the normal channel which is to be replaced by the standby channel is selected manually.
4. A digital relay system as claimed in claim 1, wherein the channels include radio links.
5. A digital relay system as claimed in claim 1, wherein the channels comprise land lines.
6. A digital signal transmission system comprising:
   (a) transmitting apparatus at a first station and
   (b) receiving apparatus at a second station
   (c) for providing a plurality of normal transmission channels and a standby channel between said first and second stations,
   (d) means for applying digital information signals to the transmitting apparatus for transmission over the normal channels,
   (e) switching means at said first station which is responsive to a signal indicating unacceptable degradation of signals received over and one of said normal transmission channels automatically to apply digital information signals in respect of said one of the normal channels to said standby channel for transmission over said standby channel,
   (f) means providing a predetermined delay in each normal transmission channel,
   (g) means providing a variable delay in said standby channel,
   (h) comparator means
      (i) for comparing digital information signals received over said standby channel and said selected normal channel and
      (ii) for adjusting said variable delay means until said received signals are substantially in synchronism, and
   (i) switching means responsive to an output signal from the comparator indicating that said received signals are in synchronism to effect the replacement of the selected normal transmission channel by the standby channel.

* * * * *